J. FLAIG.

TONGUE TRUCK FOR HARVESTERS AND BINDERS.

APPLICATION FILED JULY 27, 1909.

Reissued Nov. 22, 1910.

13,169.

2 SHEETS—SHEET 1.

Witnesses.
Laura E. Claypool
Wm. A. Queen

Inventor.
John Flaig
by Chas. H. LaPorte
Atty.

J. FLAIG.

TONGUE TRUCK FOR HARVESTERS AND BINDERS.

APPLICATION FILED JULY 27, 1909.

Reissued Nov. 22, 1910.

13,169.

2 SHEETS—SHEET 2.

Witnesses:—
Laura E. Claypool.
Wm. C. Green

Inventor.
John Flaig.
By Chas. W. LaPorte
Atty.

UNITED STATES PATENT OFFICE.

JOHN FLAIG, OF BROADVIEW, MONTANA.

TONGUE-TRUCK FOR HARVESTERS AND BINDERS.

13,169. Specification of Reissued Letters Patent. Reissued Nov. 22, 1910.

Original No. 882,820, dated March 24, 1908, Serial No. 371,146. Application for reissue filed July 27, 1909. Serial No. 509,953.

*To all whom it may concern:*

Be it known that I, JOHN FLAIG, a citizen of the United States, residing at Broadview, in the county of Yellowstone and State of Montana, have invented certain new and useful Improvements in Tongue-Trucks for Harvesters and Binders, of which the following is a specification.

My invention relates to tongue trucks for harvesters and binders as well as other agricultural implements, and comprises a two wheel truck adapted to be attached to the implement frame, so as to carry the weight that otherwise would be carried by the horses.

The invention consists essentially of a truck including a rigid beam to which is attached a steering tongue capable of being swung from side to side and up or down; an axle connected with the rigid tongue and held against horizontal oscillation, but capable of having vertical oscillation; flanged wheels having a swiveled connection with the opposite ends of the axle, and chains connecting the wheels with the steering tongue, for steering the wheels when the tongue is swung to either side. The device enables the tongue to be lowered in a manner that will lessen materially the draft in operating the implement.

Figure 1:
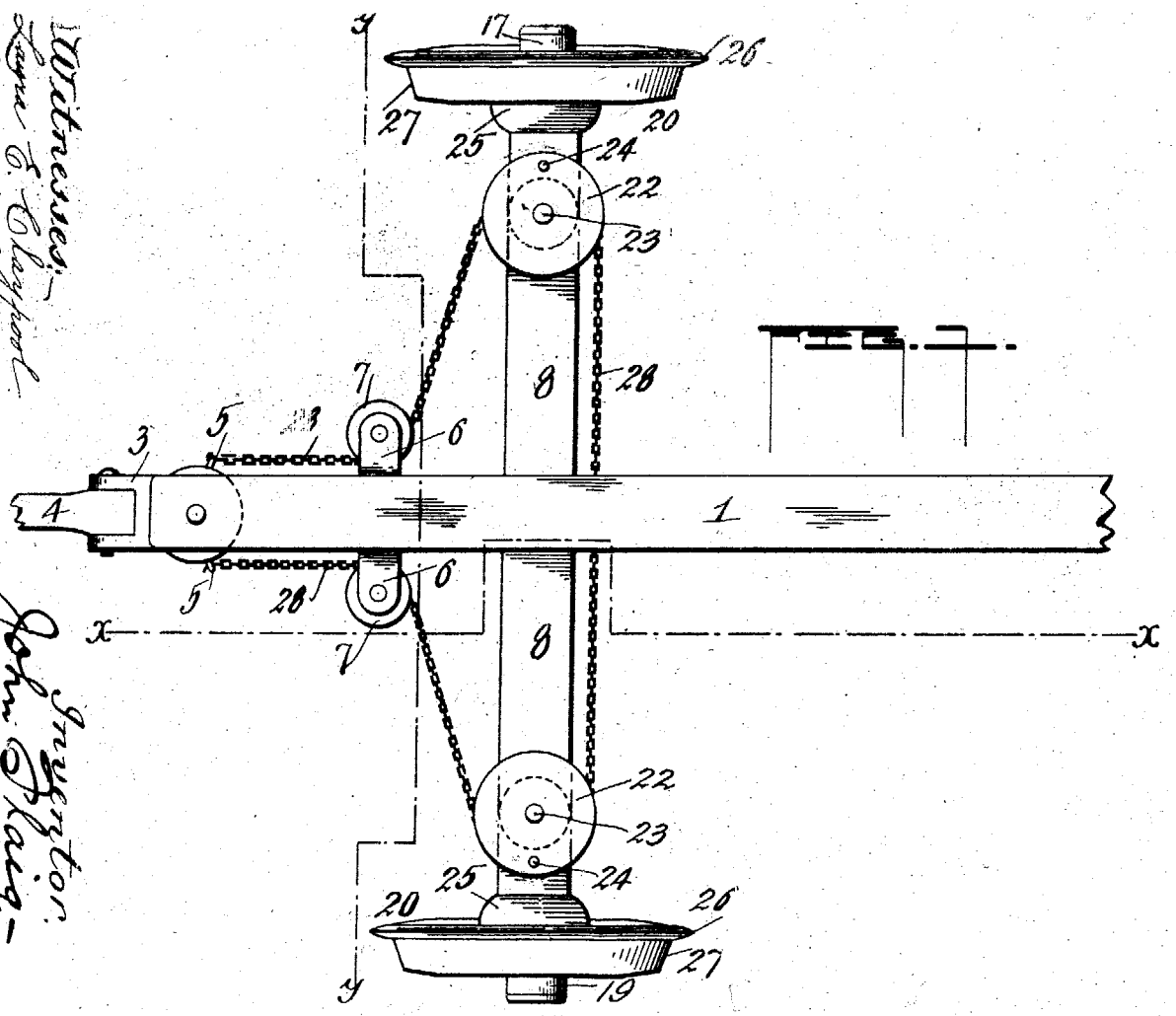
Figures 1, 2:
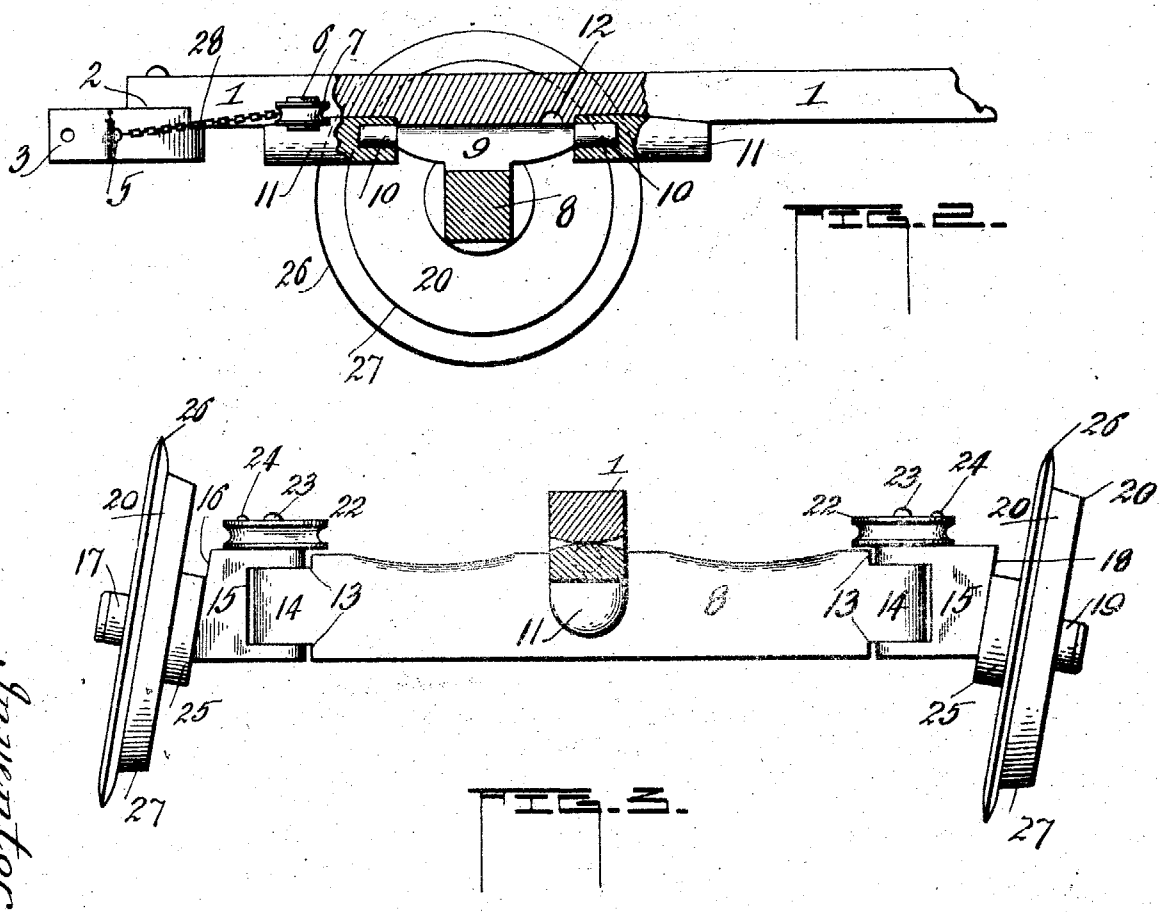

In the accompanying drawings, Figure 1, is a top plan view of my invention, the steering tongue broken away; Fig. 2 is a longitudinal view of Fig. 1, cut on the line *x*, *x*, thereby showing part of the invention in section, and Fig. 3 is a front end view, cut on the line *y*, *y*, of Fig. 1, showing part of the invention in section, the chain not shown.

My invention is described as follows:

The numeral 1, designates a longitudinal beam which is designed to be attached to the harvester, binder or other agricultural machine, and is provided at its forward end with an under recess 2. Pivoted to the end of the beam 1 and in said recess 2, is a tongue holder 3; the front end of the tongue holder is bifurcated and in said bifurcation is pivotally secured the rear end of a steering tongue 4. The connection just described between beam 1 and tongue 4, provides that the tongue 4 may be swung from side to side and up or down. Secured to each side of said tongue holder is a staple 5, and some little distance to the rear of said tongue holder and secured to each side of the longitudinal beam 1, are bearings 6, in each of which bearings is journaled a grooved pulley 7. Some little distance in the rear of said pulley wheels, and extending transversely of and beneath said longitudinal beam 1, is an axle 8, which is hinged to the beam by means of a rock bar 9, the pivot ends 10 of which are pivoted in bearings 11, secured to the lower face of said longitudinal beam. The pivotal connection of the axle with the beam 1, allows the axle to oscillate in a vertical plane but prevents its oscillation in a horizontal plane; in this way, the axle will accommodate itself to the unevenness of the ground. Cut in the lower face and crosswise of said beam 1, and a little in the rear of axle 8, is a recess 12 in which operates a steering connection to be described. Each end of said axle is provided with an upper and lower recess 13, leaving an extension 14. Pivoted to each of said extensions, so that they may work horizontally, are bifurcated spindle holders 15. The outer end 16, of the right hand spindle bearing is cut slightly on an angle outwardly and the spindle 17 is turned slightly upwardly, so as to conform to said angle.

The outer end 18, of the left hand spindle bearing is cut on an angle slightly inwardly and its spindle 19, turns slightly downwardly, conforming to said angle; the lower part of the right hand wheel 20, is thereby turned outwardly while the lower part of the left hand wheel is turned inwardly. Secured to the upper faces and inner ends of each spindle holder is a grooved pulley 22; the central bolts 23 of said pulleys pass down through said pulleys, and pivot said spindle holders 15, to said extension 14, but said pulleys are rigidly secured to said spindle holders 15, by means of bolts 24. Said wheels 20 are each provided with hubs 25, a cutting flange 26, and a shoulder 27. The cutting flanges are intended to cut slightly into the earth to prevent displacement, while the shoulders are to prevent the wheels from sinking too deeply into the ground.

A chain 28 has one end secured to the staple 5, on the right hand side of the tongue holder 3; it then passes along on the inner side of the pulley 7, secured to the right hand edge of the longitudinal beam 1, thence around the outer periphery of the grooved pulley 22, on the right hand side of the axle, thence to the left, under said beam 1, and through the recess 12, thence around the periphery of the pulley 22, on the left hand end of the axle, thence inwardly and around pulley 7, on the left hand side of said beam, and then forwardly and secured to the staple 5, on the left hand side of the tongue holder.

The operation of my invention is so apparent that further description is unnecessary.

Although I have specifically described the combination, construction and arrangement of the several parts of my invention, I do not confine myself particularly to such specific combination, construction and arrangement, as I claim the right to make such changes and modifications therein as may clearly fall within the scope of my invention and which may be resorted to without departing from the spirit, or sacrificing any of my patentable rights therein.

Having thus described my invention, what I claim as new and desire to secure by Letters Patent, is,

1. A tongue truck for harvesters and binders, consisting of a longitudinal beam 1, having pivoted to its front end a tongue holder 3, on each side of which is a staple 5 and to each side of which is journaled a grooved pulley 7, and in the under side of said beam is a cross recess 12; bearings 11, secured about midway and to the under face of said beam; rock bar 9, pivoted in said bearings; axle 8, secured to said rock bar and at right angles to said beam, said axle terminating at each end in a projection 14; bifurcated spindle holders 15, pivoted to said projections, the outer end of the spindle holder on the left hand end of the axle inclined inwardly from the top downwardly, the spindle also inclined downwardly at right angles to said inclined end 18; the outer end 16, of the spindle holder on the right hand end of the axle inclined downwardly and outwardly, the spindle 17, turning slightly upwardly at a right angle to said incline 16; wheels 20, each provided with an annular flange 26, and shoulder 27; grooved pulleys 22, rigidly secured on the top faces of said spindle holders 15; a chain 28, passing around pulleys 7 and 22, and through recess 12, and having its nds secured to staples 5, and a tongue 4, hinged in said tongue holder 7, substantially as shown and described, and for the purposes set forth.

2. In a tongue truck for harvesters and binders, the combination of a longitudinal beam 1, having in its lower face a cross recess 12; bearings 11, secured near the middle and to the under face of said beam; rock bar 9, journaled in said bearings; axle 8, secured to said rock bar at right angles to said beam; a spindle holder pivoted to each end of said axle; wheels 20, journaled on the spindles of said holders; pulleys 22, rigidly secured on the upper faces of said spindle holders; pulleys 7, one journaled on each side of said beam and in front of the axle; a tongue holder 3, pivoted to the front end of said beam; a chain passing around said pulleys and having its ends secured, one to each side of said tongue holder, said chain adapted to turn said wheels to the right or left when said spindle holders are turned to the right or left, and a tongue 4, pivoted in the front end of said tongue holder, substantially as shown and described and for the purposes set forth.

3. A tongue truck for agricultural implements, comprising a longitudinal beam, an axle connected with said beam, and held against horizontal oscillation, but capable of vertical oscillation, a member pivotally attached to the forward end of said beam, and a steering tongue pivotally attached at its inner end with said member, and in such a manner that said steering tongue may be swung up or down and from side to side.

4. A tongue truck for agricultural implements, comprising a longitudinal beam, an axle connected with said beam, and locked against horizontal oscillation, but capable of being vertically oscillated, wheels having a swiveled connection with the opposite ends of said axle, and a steering tongue having a pivotal connection at its inner end with the forward end of said beam, whereby said steering tongue may be swung up or down and from side to side, and steering connections between the steering tongue and wheels.

5. A tongue truck of the character described, comprising a beam, an axle having connection with said beam, whereby it may be oscillated in a vertical plane, but held against horizontal oscillation, wheels having a swiveled connection with said axle, a member pivotally connected with said beam, steering means connected with said member and with said wheels, and a steering tongue pivotally connected with said member.

6. A tongue truck of the character described, comprising a beam, an axle having connection with said beam, whereby it may be oscillated in a vertical plane, but held against horizontal oscillation, wheels having a swiveled connection with said axle, a member pivotally connected with said beam, a steering tongue pivotally connected with said member, and a chain operatively connected with said wheels and also with said member, whereby when said steering tongue is swung from side to side said chain will be operated to steer said wheels.

7. A tongue truck of the character described, comprising a beam, an axle extending transversely of said beam and suitably connected thereto, a steering tongue pivotally attached at its inner end with said member, and in such a manner that said tongue may be swung up or down and from side to side, steering wheels having a swiveled connection with said axle, grooved pulleys operatively connected with said steering wheels, and a chain operatively connected with said pulleys and also said steering tongue, whereby when said tongue is swung from side to side, said chain will be operated to steer said wheels.

8. A tongue truck of the character described, comprising a beam, an axle extending transversely of said beam, a rock bar extending transversely of the axle and connected thereto, suitable bearings for said rock bar, attached to said beam, wheels having a swiveled connection with the opposite ends of said axle, a steering tongue pivotally attached at its inner end with said beam, and in such a manner that said tongue may be swung up or down and from side to side, and steering connections between said steering tongue and said wheels.

9. A tongue truck of the character described, comprising a beam, an axle extending transversely of said beam, a rock bar extending transversely of the axle and connected thereto, suitable bearings for said rock bar, attached to said beam, wheels having a swiveled connection with the opposite ends of said axle, grooved pulleys operatively connected with said wheels, a steering tongue pivotally attached at its inner end with said beam, and in such a manner that said tongue may be swung up or down and from side to side, a steering chain connecting said steering tongue with said grooved pulleys, and guides for said chain between said steering tongue and said pulleys.

10. A tongue truck of the character described, comprising a beam and a steering tongue, connections between said tongue and beam, said connections being such that the tongue may be swung from side to side and up or down, an axle having connection with said beam, whereby said axle may accommodate itself to the unevenness of the ground, bifurcated spindle holders pivotally connected with the opposite ends of said axle, flanged wheels carried by the spindles of said holders, grooved pulleys operatively connected with said holders, a chain connecting said steering tongue with said grooved pulleys, and guides for said chain between said steering tongue and said grooved pulleys.

In testimony whereof I affix my signature in presence of two witnesses.

JOHN FLAIG.

Witnesses:
M. Brown,
Fred. H. Hathburn.